United States Patent [19]
Baird

[11] 3,903,350
[45] Sept. 2, 1975

[54] COMPOSITE STRUCTURE

[75] Inventor: Richard Leroy Baird, Wilmington, Del.

[73] Assignee: E. I. Du Pont de Nemours and Company, Wilmington, Del.

[22] Filed: Jan. 25, 1974

[21] Appl. No.: 436,543

[52] U.S. Cl. .............. 428/416; 156/332; 428/424; 428/458
[51] Int. Cl.² .......................................... B32B 15/08
[58] Field of Search .......... 161/184, 186, 190, 214, 161/216, 231; 156/332

[56] References Cited
UNITED STATES PATENTS

| | | | |
|---|---|---|---|
| 2,902,398 | 9/1959 | Schroeder | 161/184 |
| 3,023,126 | 2/1962 | Underwood et al. | 117/118 |
| 3,198,692 | 8/1965 | Bridgeford | 161/247 |
| 3,600,289 | 8/1971 | Bragole | 161/188 |
| 3,647,513 | 3/1972 | Jackson | 161/190 |
| 3,651,014 | 3/1972 | Witsiepe | 260/45.85 R |
| 3,819,591 | 6/1974 | Campbell et al. | 260/889 |
| 3,832,314 | 8/1974 | Hoh et al. | 156/332 |

FOREIGN PATENTS OR APPLICATIONS 1,801,628   6/1970   Germany

*Primary Examiner*—George F. Lesmes
*Assistant Examiner*—William R. Dixon, Jr.

[57] ABSTRACT

A bonded composite structure of a cured elastomeric ethylene/propylene copolymer adhered to a metal substrate by a layer of segmented copolyester adhesive, said metal coated with chlorinated rubber/phenolic-based or an epoxy-based adhesive primer, said copolyester adhesive, optionally, containing up to about 60 weight percent of a low molecular weight thermoplastic resin which forms compatible mixtures with the segmented copolymer.

20 Claims, No Drawings

COMPOSITE STRUCTURE

BACKGROUND OF THE INVENTION

This invention relates to a process for rapidly bonding a metal to a cured elastomeric hydrocarbon copolymer and to the resulting composite structure.

Various techniques have been used to bond cured elastomeric hydrocarbon copolymers to metal substrates. However, it is very difficult to form a tenacious adhesive bond between these elastomers and metals because the elastomeric hydrocarbon copolymers have very low surface tension and some metals, for example, chrome-plated steel, have such a hard, smooth surface that few materials can be satisfactorily bonded to them. Further, commonly employed thermoplastic adhesives are not entirely satisfactory bonding agents because of diminished cohesive strength when exposed to high service temperatures, e.g., above 70°C.

Within recent years, many applications for metal-rubber composite articles have developed, especially for automotive trim parts, e.g., in energy absorbing bumpers having rub strips where rubber is adhered to the impact bar of the bumper to protect the metal surface from scarring. If the composite article is to be used in the automotive trim field, it must withstand varied weather conditions, e.g., low temperatures and, especially, high temperatures and high humidity, in addition to severe impact without loss of bond strength. Further, to be used successfully in high speed assembly line operations, the process for making such articles must be one in which the bonding step is completed in about a minute or less. A simple, effective method for making such composite articles is needed in which the cured elastomeric hydrocarbon copolymer adheres tenaciously to the metal substrate without the need for bolts or other locking elements even when the composite structure is exposed to high temperatures, e.g., higher than 70°C.

SUMMARY OF THE INVENTION

It has been discovered that cured elastomeric hydrocarbon copolymers can be bonded to metal by means of a segmented copolyester thermoplastic adhesive composition provided the surfaces of the elastomer and metal are pretreated in a certain manner. More specifically, this invention is directed to a process for manufacturing a composite structure of a metal bonded to a cured elastomeric hydrocarbon copolymer which comprises coating the oxidized surface of a cured elastomeric hydrocarbon copolymer made from ethylene and propylene with an organic polyisocyanate having at least two isocyanate groups per molecule, the improvement which comprises applying a chlorinated rubber/phenolic resin-based or epoxy-based metal adhesive primer to the surface of the metal to be bonded, and interposing between the polyisocyanate coated elastomeric surface and the metal primed surface an adhesive composition, said adhesive composition comprising about 40–100 weight percent of a thermoplastic segmented copolyester having a melt index of less than 150 g./10 min. (at 200°C. under a 2,160-gram load), and a melting point of at least about 125°C., said copolyester containing 15–75, preferably 30–65, weight percent short-chain ester units represented by the formula:

$$-CRC-ODO-$$
$$\phantom{-CRC}\overset{O}{\|}\phantom{-O}\overset{O}{\|}$$

and 25–85, preferably 30–75, weight percent long-chain ester units represented by the formula:

$$-CRC-OGO$$
$$\phantom{-CRC}\overset{O}{\|}\phantom{-O}\overset{O}{\|}$$

wherein R is a divalent aromatic radical having a molecular weight of about 76–220, D is a divalent organic radical having a molecular weight of about 28–195, and G is a divalent organic radical having a number-average molecular weight of about 566 to 3,966, and up to about 60 weight percent, generally at least about 40 weight percent, of a low molecular weight thermoplastic resin which forms compatible mixtures with the segmented copolyester, is thermally stable at 150°C., and has a melt viscosity of less than about 10,000 centipoises at 200°C., applying pressure to the metal and elastomer sufficient to bond them together thus forming said composite structure. The bond between elastomer and metal is so strong that stock tear occurs instead of delamination. These composite structures having a flexible adhesive layer free from brittleness, are especially useful as bumpers or engine mounts for automobiles.

DETAILED DESCRIPTION OF THE INVENTION

The elastomeric copolymers whose surface is treated in the manner more fully described below are cured elastomeric hydrocarbon copolymers made by copolymerizing ethylene and propylene in the presence of coordination catalysts, (also known as Ziegler catalysts, and desirably using $VOCl_3$, $VCl_4$, $TiCl_4$ or vanadium tris(acetylacetonate) as the transition metal compound). The copolymers usually contain about 20 to 80, preferably 50 to 75, percent by weight ethylene units. Preferably, the copolymers used in the invention contain monomer units of at least one polyene, desirably a monoreactive non-conjugated diene, to provide at least about 0.1 gram-mole of ethylenically unsaturated side chains/kg. of copolymer as sulfur or resin cure-sites. Representative nonconjugated dienes include aliphatic dienes such as 1,4-hexadiene, cycloaliphatic dienes, such as 1,5-cyclooctadiene and cyclopentadiene, 5-alkylidene-2-norbornenes such as 5-ethylidene-2-norbornene and 5-methylene-2-norbornene, 5-alkenyl-2-norbornenes such as 5-propenyl-2-norbornene, and 5,6-alkenylene-2-norbornenes such as dicyclopentadiene. Peroxide cures are suitable for copolymers such as ethylene/propylene which are substantially saturated, or copolymers having side-chain unsaturation such as ethylene/propylene/1,4-hexadiene copolymers. Such cured elastomeric copolymers used in this invention usually contain a filler, such as carbon black, in amounts of from 75–200 parts per hundred parts elastomer, and oil, such as petroleum oil, in amounts of from 10–100 parts per hundred parts of elastomer. These cured elastomeric copolymers are well known in the art and are described in, for example, U.S. Pat. Nos. 2,933,480; 2,975,159; 3,000,867; 3,063,973; 3,063,620; 3,379,901; 3,211,709; 3,300,459; and 3,652,729. The elastomeric copolymers can also contain a direactive (dipolymerizable) fourth monomer that functions as a branching agent, such as 1,7-octadiene or 2,5-norbornadiene, that is added in very small amounts as described in U.S. application Ser. No. 247,879, filed Apr. 13, 1972, now U.S. Pat. No. 3,819,591. An ethylene/propylene/1,4-hexadiene/2,5-norbornadiene tetrapolymer is a preferred elastomeric composition, especially those containing, by weight, 25–35% propylene monomer units, 1–8% monomer units of a nonconjugated diolefin containing only one polymerizable double bond selected from aliphatic diolefins and cycloaliphatic compounds having a one- or two- carbon bridged ring structure, such as 1,4-hexadiene, dicyclopentadiene, 5-ethylidene-2-norbornene or 5-(2'-propenyl)-2-norbornene, and 0.1–0.4% direactive polyolefin units, such as 2,5-norbornadiene monomer units.

The surface of the cured elastomeric hydrocarbon copolymer can be oxidized in any suitable manner, for example, by treatment with ozone, ultraviolet light in the presence of air, sulfuric acid-dichromate oxidation or flame treatment. Preferably, the surface of the copolymer that is to be bonded is treated, i.e., oxidized, with ultraviolet light with or without a sensitizer such as benzophenone, to increase the bondability of its surface to the adhesive composition. Ultraviolet radiation, having a wave length of from 2,000 to 4,000 A for a dosage of 0.5–10 joules/sq.cm., preferably 0.7–7 joules/sq.cm., sufficiently oxidizes the surface of the elastomeric copolymer. The surface of the elastomeric hydrocarbon copolymer can also be oxidized by treatment with an ozone-air mixture wherein the ozone concentration is at least about 100 to about 12,000 parts per million. Usually, oxidation of the surface in such cases is complete in about one-half to 15 minutes at the above-mentioned ozone concentrations.

The surface of the oxidized elastomer is then coated with an organic polyisocyanate having an —NCO functionality of at least two —NCO groups per molecule and an equivalent weight below about 300.

Aromatic, aliphatic and cycloaliphatic polyisocyanates can be used in the present invention. The preferred polyisocyanates are the $C_6$–$C_{25}$ aromatics, $C_2$–$C_{18}$ aliphatics and $C_5$–$C_{25}$ cycloaliphatics. Representative aromatic polyisocyanates include 2,4-tolylene diisocyanate and its trimer 2,6-tolylene diisocyanate, 4,4'-methylenebis(phenyl isocyanate), 1,3-phenylene diisocyanate, triphenylmethane triisocyanate, 2,4,4'-triisocyanatodiphenyl ether, 2,4-bis(4-isocyanatobenzyl)phenyl isocyanate and related polyaryl polyisocyanates, 1,5-naphthalene diisocyanate and mixtures thereof. Representative aliphatic polyisocyanates include hexamethylene diisocyanate, xylylene diisocyanate, 1,12-dodecane diisocyanate and lysine ethyl ester diisocyanate. Representative cycloaliphatic polyisocyanates include 4,4'-methylene-bis(cyclohexyl isocyanate), 1,4-cyclohexylene diisocyanate, 1-methyl-2,4-cyclohexylene diisocyanate and 2,4-bis(4-isocyanatocyclohexylmethyl)cyclohexyl isocyanate. The polyisocyanates can be used in refined grades or as undistilled crude products containing varying amounts of phosgenation by-products. Representative isocyanates that are readily available and particularly preferred are poly(methylenephenyl isocyanate) (PAPI) and methylene bis(4-phenyl isocyanate). Conveniently, the isocyanate can be, and usually is, applied to the surface of the elastomer in a solvent. Representative solvents include aromatic hydrocarbons such as toluene, aliphatic hydrocarbons such as hexane, cycloaliphatic hydrocarbons such as cyclohexane, chlorinated hydrocarbons such as dichloromethane, ketones such as acetone and methyl ethyl ketone, esters such as ethyl acetate and butyl acetate and aliphatic ethers such as ethyl cellosolve. The amount of organic polyisocyanate used is that sufficient to form a thin coating, e.g., one to ten mils, on the oxidized surface of the elastomer.

The cured elastomeric copolymer can be adhesively bonded to any metal to form a composite article. Representative metals that are used to form the composite structure include steel, copper, brass, aluminum, or iron. Preferably, the cured elastomeric copolymer is bonded to chrome plated steel to form bumpers for automotive use. In order that the composite article display desirable weathering resistance, the surface area of the metal that is to form the bond must be coated with certain primers that are characterized as epoxy-based or chlorinated rubber/phenolic resin-based adhesive primers. Epoxy-based or chlorinated rubber/phenolic resin-based primers applied to the metal surface to be bonded provide excellent humidity resistance at the bond and promote the formation of a strong bond with the copolyester.

Representative epoxy-based primers include the reaction products of aliphatic or aromatic polyols having molecular weights up to 300 with excess epichlorohydrin. A particularly useful class of epoxy-based primers that can be used in the present invention have the formula

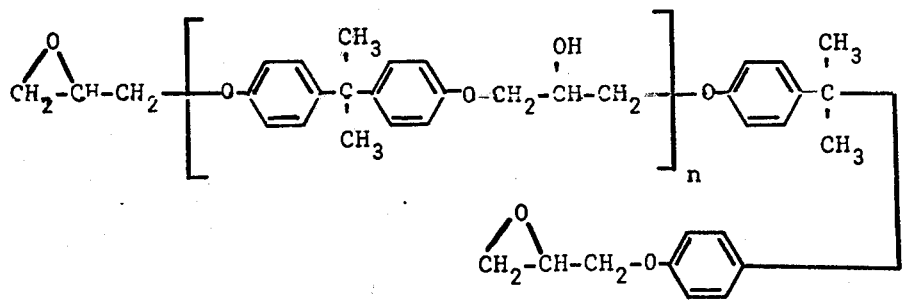

wherein $n$ = 0–1,000, frequently 0–10. These compounds are the well-known reaction products of epichlorohydrin and 4,4'-isopropylidenebisphenol (also called bisphenol-A), and are described in U.S. Pat. Nos. 2,633,458 and 2,902,398. Glycerol can be used in place of part or all of bisphenol-A. Other epoxy-based primers that can be used to coat the surface of the metal are described in *Handbook of Adhesives* by Skeist, Reinhold Publishing Corp., N.Y., 1962, pages 298–305, 323–332, 512–522, and 601–608, and Kirk-Othmer, *Encyclopedia of Chemical Technology*, Second Edition, 1965, Interscience Publishers, N.Y., Vol. 8, pages 294–312.

The epoxy-based primers can contain additional components such as antioxidants, reactive and/or catalytic hardeners, and fillers (such as silica and carbon black). Reactive hardeners are often supplied in stoichiometric proportions based on the epoxy group content. Polyamines such as diethylenetriamine, m-phenylenediamine, 4,4'-sulfonyldianiline, and 4,4'-methylenedianiline are examples. Catalytic hardeners that can be used in less than stoichiometric proportions include tris(dimethylaminomethyl)phenol, BF$_3$.ethylamine adduct, and phthalic anhydride. The epoxy resin primers can be partially prereacted before use; such products will have few or no terminal epoxy groups.

Chlorinated rubber/phenolic based metal adhesive primers are a mixture of chlorinated natural rubber (or chlorinated cis-1,4-polyisoprene) and phenol-formaldehyde resin usually containing a minor proportion of at least one filler such as silicon dioxide, carbon black, and zinc oxide. The ratio of rubber to resin ranges from about 1:2 to 2:1.

Chlorinated rubber is described in U.S. Pat. Nos. 2,072,255 2,101,138. It is frequently made by treating a solution of natural rubber (usually degraded by milling or oxidative scission, e.g., with chlorine dioxide) with chlorine at 80°C., until the chlorine content of the rubber reaches about 65–72% by weight. This partially cyclized product has a specific gravity of 1.54–1.66, a refractive index of 1.554–1.596, and a molecular weight as high as 100,000, or above.

Heat curable phenol-formaldehyde resols can be present as a component in the primer containing chlorinated rubber. Resols are prepared by heating phenol (optionally having p-substituent, such as a C$_3$–C$_{20}$ p-alkyl, a C$_5$–C$_6$ cycloalkyl, phenyl, and benzyl) with more than a mole of formaldehyde in the presence of a strong basic catalyst such as an alkali metal hydroxide at 25°–100°C. to form methylol phenols and then forming condensation polymers by heating at about 75°–175°C. The mixture is then neutralized and the resol recovered. If part or all of the synthesis is done in the presence of an alcohol such as methanol or butanol the resol will have the structure

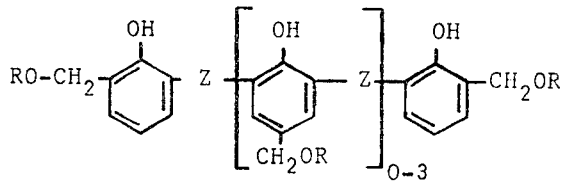

where Z = —CH$_2$— or —CH$_2$—O—CH$_2$—, and R = H, CH$_3$—, CH$_3$CH$_2$CH$_2$CH$_2$—.

Examples of suitable dimethylol phenols that can be used in the invention either in the polymeric or monomeric form are 2,6-dimethylol-4-methyl phenol; 2,6-dimethylol-4-t-butyl phenol; 2,6-dimethylol-4-t-amyl phenol; 2,6-dimethylol-4-(1,1,3,3-tetramethyl butyl)phenol; 2,6-dimethylol-4-nonyl phenol; 2,6-dimethylol-4-dodecyl phenol; 2,6-dimethylol-4-phenyl phenol; 2,6-dimethylol-4-benzyl phenol; 2,6-dimethylol-4-(alpha,alpha-dimethylbenzyl)phenol; and 2,6-dimethylol-4-cyclohexyl phenol.

The dimethylol phenols and resins prepared therefrom and methods for preparation of the phenols and resins are more particularly described in *Phenoplasts: Their Structure, Properties, and Chemical Technology*, T. S. Carswell, Vol. III of High Polymers, Interscience Publishers, Inc., New York, pages 6–73, 204–207, and U.S. Pat. No. 2,963,462.

The thermoplastic segmented copolyester adhesive used has a melt index of less than 150 grams/10 minutes at 200°C. under a 2,160 gram load and consists essentially of 15–75 weight percent recurring short-chain ester units represented by the formula:

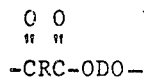

and 25–85 weight percent long-chain ester units joined through ester linkages, and represented by the formula

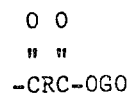

wherein R is a divalent aromatic radical having a molecular weight of about 76–220, D is a divalent organic radical having a molecular weight of about 28–195, and G is a divalent organic radical having a number-average molecular weight of about 566–3,966. The term "short-chain ester units," as applied to units in a polymer chain, refers to the reaction products of low-molecular weight diols with dicarboxylic acids to form repeat units having molecular weights of 192–503. These units are also referred to herein as "hard segments." The term "long-chain ester units," as applied to units in a polymer chain, refers to the reaction products of long-chain glycols with dicarboxylic acids. These repeat units have molecular weights of 730–4,274. These units are also referred to herein as "soft segments."

The copolyesters used as adhesives in this invention are prepared by polymerizing with each other (a) one or more aromatic dicarboxylic acids R(CO$_2$H)$_2$, (b) one or more linear long-chain glycols G(OH)$_2$, and (c) one or more low molecular weight diols D(OH)$_2$. By the term "aromatic dicarboxylic acid" is meant a dicarboxylic acid in which the carboxyl groups are attached to benzenoid carbon atoms in an isolated or fused ring system. The term "dicarboxylic acid," as used herein, is intended to include the equivalents of dicarboxylic acids, that is, their esters or ester-forming derivatives such as acid chlorides and anhydrides, or other derivatives which can be substituted for dicarboxylic acids in a polymerization reaction to make a copolyester.

The aromatic dicarboxylic acid monomers have a molecular weight of 166 to 310. This molecular weight requirement pertains to the acid itself and not to its ester or ester-forming derivative. Any derivative should furnish "R" groups having a molecular weight of 76–220. The aromatic dicarboxylic acids used in the preparation of the segmented copolyester can contain any substituent groups or combination thereof which do not interfere with the polymerization reaction. Representative aromatic dicarboxylic acids include terephthalic acid, isophthalic acid, phthalic acid, bibenzoic acid, substituted dicarboxy compounds with benzene nuclei such as 4,4'-methylenedibenzoic acid, 4,4'-oxydibenzoic acid, ethylenebis(p-oxybenzoic acid), 4,4'-ethylenedibenzoic acid, tetramethylenebis(p-oxybenzoic acid), 1,5-naphthalenedicarboxylic acid, 2,6-naphthalenedicarboxylic acid, 2,7-naphthalenedicarboxylic acid, phenanthrenedicarboxylic acid, anthracenedicarboxylic acid, 4,4'-sulfonyldibenzoic acid, indene dicarboxylic acid, as well as ring-substituted derivatives thereof, such as C$_1$–C$_{10}$ alkyl, halo, or C$_1$–C$_4$ alkoxy.

The preferred aromatic dicarboxylic acids used in the preparation of the segmented copolyester adhesives are the aromatic acids of 8–16 carbon atoms, particularly phenylenedicarboxylic acids, such as phthalic, terephthalic and isophthalic acids. The most preferred acids are terephthalic acid and mixtures of terephthalic and isophthalic acids.

The low molecular weight diols used in the preparation of the hard segments of the copolyesters have molecular weights of 62 to 229. The term "low molecular weight diol," as used herein, includes equivalent ester-forming derivatives which provide "D" groups having a molecular weight in the range of about 28 to 195.

Suitable low molecular weight diols which react to form the short-chain ester units of the copolyesters include acyclic, alicyclic and aromatic dihydroxy compounds. The preferred diols are those with 2–15 carbon atoms such as ethylene, propylene, trimethylene, tetramethylene, isobutylene, pentamethylene, 2,2-dimethyltrimethylene, hexamethylene and decamethylene glycols, cyclohexanediols, cyclohexanedimethanol, resorcinol, hydroquinone, 1,5-naphthalene diol. Especially preferred are the aliphatic diols of 2–8 carbon atoms. Suitable bis-phenols include 4,4'-diphenylene diol, 4,4'-methylenediphenol, 4,4-ethylenediphenol, 4,4'-trimethylenediphenol and isopropylidenediphenol. Equivalent ester-forming derivatives of diols are also useful. For example, ethylene oxide or ethylene carbonate can be used in place of ethylene glycol.

The long-chain αω-glycols used to prepare the soft segments of these copolyesters have number-average molecular weights of about 600–4,000, and preferably about 800–3,000. Preferably, the long-chain glycols have melting points of less than about 55°C., and carbon atom to oxygen atom ratios which are greater than about 2.5, that is, greater than about 2.5:1.

Suitable α,ω- long-chain glycols which can be used in preparing the soft segments of the copolymers include poly(alkylene ether) glycols in which the alkylene group has from 3–9 carbon atoms, such as poly(1,2- and 1,3-propylene ether)glycol, poly(1,2-butylene ether)glycol, poly(tetramethylene ether)glycol, poly(pentamethylene ether)glycol, poly(hexamethylene ether)glycol, poly(heptamethylene ether)glycol, poly(octamethylene ether)glycol, poly(nonamethylene ether)glycol, and random or block copolyether glycols, for example, glycols derived by copolymerizing tetrahydrofuran and 1,2-propylene oxide (or an oxetane, such as oxycyclobutane).

Suitable long-chain glycols also include polyformals prepared by reacting formaldehyde with glycols such as pentamethylene glycol or mixtures of glycols such as a mixture of tetramethylene and pentamethylene glycols. Poly(alkylenethioether) and poly(alkylene ether thioether) glycols also provide useful copolyester adhesives. The preferred long-chain glycols are poly(alkylene ether) glycols and glycol esters of poly(alkylene oxide)dicarboxylic acids.

The relative molecular weight of the segmented copolyester adhesive is expressed herein in terms of melt index, which is an empirical measurement of inverse melt viscosity. The segmented copolyester should have a melt index of less than about 150 grams/10 minutes at 200°C. under a 2,160 gram load. The melt indices specified herein are determined by the American Society for Testing and Materials (herein abbreviated "ASTM") test method D 1238, at 200°C. with a 2,160-g. load.

It is required that the segmented copolyester adhesive have a melting point of at least about 125°C. Preferably, the segmented copolyester has a melting point of at least about 140°C. The high-melting segmented copolyesters maintain their high melting characteristics when blended with low molecular weight thermoplastic resins.

The required high melting point of the segmented copolyester adhesive is obtained by providing the polyester with crystallizable short-chain ester segments. Crystallinity in the short-chain ester segments is increased by the use of more linear and symmetrical aromatic diacid. By "linear" aromatic diacid is meant a diacid in which each of the bonds between the carboxyl carbons and their adjacent carbons fall on a straight line drawn from one carboxyl carbon to the other. By "symmetrical" aromatic diacid is meant a diacid which is symmetrical with respect to a center line drawn from one carboxyl carbon to the other.

The melting points specified herein are determined by differential thermal analysis (ASTM Method D 2117). The melting point is read from the position of the endotherm peak in a thermogram when the sample is heated from room temperature at the rate of 10°C./min. The details of this method are described in many publications, for example, by C. B. Murphy in *Differential Thermal Analysis*, R. C. Mackenzie, Editor, Volume I, pages 643 to 671, Academic Press, New York, 1970.

The preferred segmented copolyester adhesives are those in which the aromatic dicarboxylic acid has from 8–16 carbon atoms, the low molecular weight diol is an aliphatic diol having from 2–8 carbon atoms, the long-chain glycol is poly(alkylene ether)glycol in which the alkylene group has from 3–9 carbon atoms, the short-chain ester units amount of about 30–65 percent by weight of the copolyester, the long-chain ester units amount to about 30–70 percent by weight of the copolyester, and the copolyester has a melt index of less than about 50, a melting point of at least about 140°C., and a Shore D (ASTM D 2240) durometer hardness of 30 to 50, preferably 40.

The copolyester adhesives prepared from terephthalic acid, or a mixture of terephthalic and isophthalic acids, 1,4-butanediol and poly(tetramethylene ether) glycol having a molecular weight of about 600–3,000 are particularly preferred.

The copolyester adhesives used in this invention can be made by conventional condensation polymerization procedures, as for example, in bulk or in a solvent medium which dissolves one or more of the monomers. They are conveniently prepared by a conventional ester interchange reaction. A preferred procedure involves heating the dimethyl ester of terephthalic acid, or a mixture of terephthalic and isophthalic acids, with a long-chain glycol and an excess of a short-chain diol in the presence of a catalyst at 150°–260°C., followed by distilling off the methanol formed by the interchange. Heating is continued until methanol evolution is complete. Depending on the temperature, catalyst and diol excess, this polymerization is complete within a few minutes to a few hours. This procedure results in the preparation of a low molecular weight prepolymer which can be converted to the high molecular weight segmented copolyester.

The resulting prepolymer is then converted to the high molecular weight segmented copolyester elastomer by distillation of the excess of short-chain diol. Best results are usually obtained if this final distillation is carried out at less than 1 mm pressure and 240°–260°C. for less than 2 hours in the presence of an antioxidant such as sym-di-beta-naphthyl-p-phenylenediamine or 1,3,5-trimethyl-2,4,6-tris-[3,5-ditertiary-butyl-4-hydroxybenzyl]benzene.

Most practical polymerization techniques rely on ester interchange to complete the polymerization reaction. In order to avoid excess hold times at high temperatures with possible irreversible thermal degradation, it is advantageous to employ a catalyst for the ester interchange reaction. While a wide variety of catalysts can be used, organic titanates such as tetrabutyl titanate, used alone or in combination with magnesium or zinc acetates, are preferred. Complex titanates, such as $Mg[HTi(OR)_6]_2$, derived from alkali or alkaline earth metal alkoxides and titanate esters are also very effective. Inorganic titanates such as lanthanum titanate, calcium acetate/antimony trioxide mixtures, and lithium and magnesium alkoxides are representative of other catalysts which can be used.

In addition to the flexible, non-brittle segmented copolyester, the copolyester adhesive composition can also contain, if desired, up to about 60 weight percent of one or more low molecular weight thermoplastic resins which form compatible mixtures with the segmented copolyester, are thermally stable at about 150°C., and have melt viscosities of less than about 10,000 centipoises at 200°C. These resins are added to control the hardness of the adhesive. The term "thermoplastic resin," as used throughout the specification and claims, is intended to include heat-softenable resins, both natural and synthetic, as well as waxy types of materials. By the term "compatible" is meant that there is no separation into distinct layers between the segmented copolyester and the low molecular weight resin or resins at the copolyester melt temperature. In some cases, this compatibility is achieved in multicomponent blends even though one of the low molecular weight thermoplastic resin components may not be compatible with the segmented copolyester elastomer alone. By the phrase "thermally stable" is meant that there is no significant permanent alteration in the properties of the resin after heating at the specified temperatures for one hour in the presence of air. The melt viscosities specified herein are measured with a Brookfield viscometer by ASTM test method D 1824-66 elevated temperatures as indicated.

Suitable low molecular weight thermoplastic resins include hydrocarbon resins, bituminous asphalts, coal tar pitches, rosins, phenolic resins, and chlorinated aliphatic hydrocarbon waxes.

The term "hydrocarbon resins" refers to hydrocarbon polymers derived from coke-oven gas, coal-tar fractions, cracked and deeply cracked petroleum stocks, essentially pure hydrocarbon feeds, and turpentines. Typical hydrocarbon resins include coumarone-indene resins, petroleum resins, styrene polymers, cyclopentadiene resins, and terpene resins. These resins are fully described in the Kirk-Othmer "Encyclopedia of Chemical Technology," Second Edition, 1966, Interscience Publishers, New York, Volume 11, pages 242 to 255.

The term "coumarone-indene resins" refers to hydrocarbon resins obtained by polymerization of the resin-formers recovered from coke-oven gas and in the distillation of coal tar and derivatives thereof such as phenol-modified coumarone-indene resins. These resins are fully described in the Kirk-Othmer Encyclopedia, supra, Volume 11, pages 243 to 247.

The term "petroleum resins" refers to hydrocarbon resins obtained by the catalytic polymerization of deeply cracked petroleum stocks. These petroleum stocks generally contain mixtures of resin-formers such as styrene, methyl styrene, vinyl toluene, indene, methyl indene, butadiene, isoprene, piperylene and pentylenes. These resins are fully described in the Kirk-Othmer Encyclopedia, supra, Volume 11, pages 248 to 250. The so-called "polyalkyl-aromatic resins" fall into this classification.

The term "styrene polymers" refers to low molecular weight homopolymers of styrene as well as copolymers containing styrene and other comonomers such as alphamethyl-styrene, vinyl toluene, and butadiene when prepared from substantially pure monomer.

The term "cyclopentadiene resins" refers to cyclopentadiene homopolymers and copolymers derived from coal-tar fractions or from cracked petroleum streams. These resins are produced by holding a cyclopentadiene-containing stock at elevated temperature for an extended period of time. The temperatures at which it is held determine whether the dimer, trimer, or higher polymer is obtained. These resins are fully described in the Kirk-Othmer Encyclopedia, supra, Volume 11, pages 250 and 251.

The term "terpene resins" refers to polymers of terpenes which are hydrocarbons of the general formula $C_{10}H_{16}$ occurring in most essential oils and oleoresins of plants and phenol-modified terpene resins. Suitable terpenes include alpha-pinene, beta-pinene, dipentene, limonene, myrcene, bornylene, and camphene. These resins are fully described in the Kirk-Othmer Encyclopedia, supra, Volume 11, pages 252 to 254.

The term "bituminous asphalts" is intended to include both native asphalts and asphaltites such as Gilsonite, Glance pitch and Grahanite. A full description of bituminous asphalts can be found in Abraham's "Asphalts and Allied Substances," 6th Edition, Volume 1, Chapter 2, Van Nostrand Co., Inc., particularly Table III, on page 60.

The term "coal-tar pitches" refers to the residues obtained by the partial evaporation or distillation of coal tar obtained by removal of gaseous components from bituminous coal. Such pitches include gas-works coal-tar pitch, coke-oven coal-tar pitch, blast-furnace coal-tar pitch and producer-gas coal-tar pitch. These pitches are fully described in Abraham's "Asphalts and Allied Substances," supra, particularly Table III on page 61.

The term "rosins" refers to the resinous materials that occur naturally in the oleoresin of pine trees, as well as derivatives thereof including rosin esters, modified rosins such as fractionated, hydrogenated, dehydrogenated, and polymerized rosins, and modified rosin esters. These materials are fully described in the Kirk-Othmer Encyclopedia, supra, Volume 7, pages 475 to 505.

The term "phenolic resins" refers to the products resulting from the reaction of phenols with aldehydes. In addition to phenol itself, cresols, xylenols, p-tert-butylphenol, p-phenylphenol and the like can be used as the phenol component. Formaldehyde is the most common aldehyde, but acetaldehyde and furfuraldehyde can also be used. These resins are fully described in the Kirk-Othmer Encyclopedia, supra, Volume 15, pages 176 to 207.

The adhesive compositions used can contain more than one low molecular weight thermoplastic resin. For example, low molecular weight styrene polymers have been found to lower the melt viscosity of these compositions without substantially lowering the softening point. Since low melt viscosity contributes improved wetting by the composition of the surface of the substrate, which results in better adhesion, many useful compositions will contain some styrene polymer. Styrene polymers are also useful for increasing the compatibility of other resins with the segmented copolyester elastomeric adhesive. Coumarone-indene resins of high softening point have been found to give strength to the compositions. Phenol-modified courmarone-indene resins have been found to have the effect of lowering the softening point of the compositions. In fact, the effect of phenol-modified courmarone-indene resins on the melting point is so great that the desired melting point is generally achieved by the addition of only a small amount of this resin. Any combination of these desired properties can be achieved by mixing two or more low molecular weight thermoplastic resins with the copolyester elastomer in a proper proportion.

It is sometimes desirable to stabilize the adhesive compositions against heat or radiation by ultraviolet light. This can be done by incorporating stabilizers or antioxidants in these compositions. Satisfactory stabilizers comprise phenols and their derivatives, amines and their derivatives, compounds containing both hydroxyl and amine groups, hydroxyazines, oximes, polymeric phenolic esters, and salts of multivalent metals in which the metal is in its lower valence state.

Representative phenol derivatives useful as stabilizers include hydroquinone, 2,6-ditertiary-butyl-p-cresol, tetrakis[methylene-3-(3′,5′-ditertiary-butyl-4′-hydroxyphenyl) propionate] methane, 4,4′-bis(2,6-ditertiary-butylphenol), 1,3,5-trimethyl-2,4,6-tris[3,5-ditertiary-butyl-4-hydroxybenzyl] benzene, and 4,4′-butylidene-bis(6-tertiary-butyl-m-cresol). Various inorganic metal salts or hydroxides can be used as well as organic complexes such as nickel dibutyl dithiocarbamate, manganous salicylate, and copper 3-phenylsalicylate. Typical amine stabilizers include aromatic amines such as N,N′-bis(beta-naphthyl)-p-phenylenediamine, N,N′-bis(1-methylheptyl)-p-phenylenediamine, and either phenyl-beta-naphthylamine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones or benzotriazoles.

The copolyester elastomers and the low molecular weight thermoplastic resins are easy to blend together due to the relatively low melt viscosity of these compositions at elevated temperatures as compared to compositions of the prior art having comparable bond strength. The copolyester-resin adhesive composition can be blended by various well known procedures such as, for example, blending in molten form, blending in a solvent, such as chloroform or methylene chloride, or mixing aqueous dispersions of the components.

Aqueous dispersions of the thermoplastic compositions can be prepared by dissolving the segmented copolyester and the low molecular weight thermoplastic resin together in a suitable water-immiscible organic solvent, emulsifying the organic solvent containing the segmented copolyester and the low molecular weight thermoplastic resin in water, and removing the organic solvent as described by Funck and Wolff in U.S. Pat. No. 3,296,172.

After the surface of the cured elastomer has been successively oxidized and coated and the metal has been primed, the adhesive copolyester composition is interposed between the surface of the primed metal and polyisocyanate-coated cured hydrocarbon elastomer. The copolyester can be applied to the surfaces in the form of a dry blend, a solution, an aqueous dispersion, or in molten form. Generally, the adhesive composition is applied to the polyisocyanate-coated cured elastomer surface. Conventional application equipment can be used for applying the adhesive compositions in the various forms. For application of solutions, dispersions, or melts, various known application techniques can be used including brushing, spraying, or roll-coating.

The composite structure of elastomer-copolyester-metal is placed in a hydraulic press. Sufficient pressure, e.g., of the order of about 10 to 100 psi, is applied to bond the elastomer and metal. The pressure causes the adhesive to flow properly and contact the surface of the elastomer and metal being bonded. If the adhesive is in the solid state, heat is also applied during the bonding operation so that the adhesive composition is converted to the molten state. The adhesive can be melted and applied as a liquid, in which case heat is not required. However, glue-line temperatures of the order of 160°C. to 200°C. are generally used during the bonding step in order to assure that the adhesive is in the molten state. The adhesive composition readily flows on the surface of the polyisocyanate-coated elastomer and the primer-coated metal and the metal becomes tenaciously bonded to the elastomer, usually in less than about 1 minute. The adhesive layer of the composite structure is allowed to cool to ambient temperature upon removal from the press.

The composite structures are useful as automobile bumpers and are especially effective as engine mounts and other "under the hood" application for automotive use where high temperature capabilities of the bonded article are necessary.

The following examples illustrate the invention in detail.

EXAMPLE 1

A sample of EPDM-hydrocarbon elastomer was compounded as follows:

|  | Parts by Weight |
|---|---|
| Ethylene/Propylene/1,4-Hexadiene (EPDM)* | 100 |
| FEF Carbon Black** | 120 |
| Zinc Oxide | 5 |
| Zinc Stearate | 1.5 |
| Paraffinic Oil, Saybold Universal Viscosity 155 sec. at 100°F., 43.6 sec. at 210°F. | 45 |
| [(C$_4$H$_9$O)$_2$-PS$_2$]$_2$Zn*** | 2 |
| Sulfur | 3 |
| (2-Morpholinothio)benzothiazole | 1 |

*Monomer units composition (by weight): 57% ethylene, 37% propylene, 6% 1,4-hexadiene. Mooney viscosity (ML-1+4/121°C.) 35
**ASTM Designation N-550
***C$_4$H$_9$O = butoxy The copolymer was cured for 10 minutes at 117°C. in a 1-inch (2.54-cm) by 6-inch (15.3-cm) by ¼-inch (0.635-cm) compression mold between sheets of polyester film. Slabs so cured were then cleaned by a solvent wipe with trichloroethylene and dipped into a 5% (Wt/Wt) solution of benzophenone in 1,1,1-trichloroethane. They were withdrawn from this solution at such a rate so as to allow the solvent to evaporate completely as they were withdrawn. Slabs were then, in no more than 20 minutes' time after dipping, placed 8 inches (20.2 cm) beneath a source of ultraviolet light (capable of providing 0.25 joule/cm² of energy in the wave length region of 3,500 ± 500 A in a 10-second period) for about 30 seconds. Slabs thus prepared will be referred to as "ultraviolet treated EPDM slabs." Slabs so treated could be stored for indefinite periods.

Shortly before bonding, an ultraviolet-treated EPDM slab was wiped with a clean cloth wetted with trichloroethylene and then painted with a 5% solution of the polyisocyanate poly(methylenephenyl isocyanate) (PAPI)* in dichloromethane. Slabs treated in this fasion were boneded within a few hours of treatment.

An adhesive composition was prepared by melt blending forty parts by weight of a low molecular weight polystyrene resin component (having a ball and ring melting point of 50°C., a molecular weight of about 350, and a specific gravity of about 1.04) and 60 parts by weight of a thermoplastic segmented copolyester component. The polyester component was made by condensation copolymerization of 35 ml polytetramethyleneether glycol (number-average molecular weight 1000) (PTMEG-1000), 25 ml. 1,4-butanediol (E), 31 g. dimethyl terephthalate (T), and 9 g. dimethyl isophthalate (I) in the presence of tetrabutyl titanate and magnesium acetate. The copolyester had a Shore D hardness of 40, a melt index** of 4.8 g./10 min., and a melting point of 168°C. The copolyester had an inherent viscosity of about 1.5 ±0.05 (measured at 30°C. on a solution of 0.5 g. of copolyester in 100 ml. of a mixed solvent containing 54 parts phenol, 6 parts water and 40 parts 1,1,2-trichloroethane). In the copolyester there was 49 weight percent short-chain ester units ("4-EI," 11 weight percent; "4-ET," 38 weight percent), the long-chain ester units ("PTMEG-1000I" or "PTMEG-1000T") amounted to 51 weight percent.

* 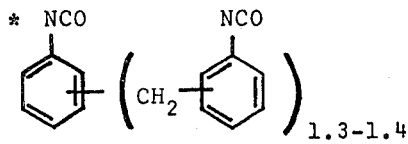

**melt index ASTM D-1238 200°C., 2,160 g. wt.

During melt blending the mixture was blanketed with nitrogen and the temperature was not allowed to exceed 230°C. The adhesive composition was pressed between sheets of polyester to a thickness of 10 mils (0.025 cm) at a temperature of 177°C.

Before use, the resulting adhesive "sandwich" was cut to the desired size and cooled to −78°C. in crushed solid carbon dioxide. At this temperature, the polyester film could be stripped off leaving a 10-mil sheet of the adhesive of the desired size.

Steel coupons approximately 5 inches (12.7 cm) by 1 inch (2.54 cm) by 16 gauge (0.129 cm) were cleaned by sandblasting, then degreased in refluxing perchloroethylene vapor, and cooled. Two coats of an epoxy-based primer (Thixon AB 1244) manufactured by Dayton Chemical Products Division Of Whittatker Corporation, West Alexandria, Ohio, were painted on one side of this metal coupon. The primer was a cellosolve acetate solution of a linear copolymer of epichlorohydrin and 4,4'-propylidenebisphenol having the formula

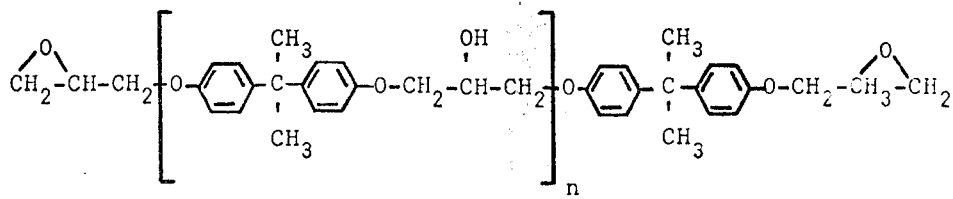

wherein n = 8–11, which had been chain extended leaving an insignificant proportion of terminal epoxy groups. About 0.2 weight percent SiO₂ was also present based on the whole weight of the primer.

The central 2 ¼ inches (5.72 cm) of the primed steel coupon was masked by placing four 1-mil (0.0025-cm) strips of half-inch wide (1.27-cm) polyester tape, one on top of another on each end of the coupon to give a 4-mil (0.010-cm) thick band at each end. Between these bands was placed a strip of the above-mentioned adhesive composition 1 inch by 2 ¼ inches by 10 mils (2.54 by 5.72 by 0.025 cm) and centered on top of this an ultraviolet treated EPDM slab, which had been coated with poly(methylene phenyl isocyanate) as described above. The slab was placed parallel to the metal coupon with the treated surface facing the adhesive film layer. This configuration (primed metal coupon-adhesive-coated, treated EPDM) was placed in a hydraulic press (which had been preheated to 177°C.) and compressed under a pressure of about 40 psi (3.6 kg/cm²) for a total of 1 minute. During this time, heat was conducted to the glue line which reached a temperature of about 166°C. At the end of this time, pressure was removed and the composite was rapidly removed from the press and allowed to cool to room temperature.

Adhesion of the composite was tested by ASTM D-429-B T-peel test (at 25°C.), modified to the extent that both ends of the bonded composite were pulled. values of 92 and 97 pounds per lineal inch (16.4–17.3 kg/cm) were obtained with 100% of the failure occurring in the EPDM.

EXAMPLE 2

The procedure described in Example 1 was repeated except that a polished, chrome-plated steel coupon was used in place of the steel. The metal was degreased in perchloroethylene vapor but not sandblasted. It was then painted with the same epoxy-based primer used in Example 1. The primed metal coupon was heated at 232°C. for 5 minutes. Application of the adhesive was carried out as in Example 1, but the bonded composite was placed in a steam bath for 1 hour, then removed and cooled to room temperature. The T-peel test was carried out as in Example 1 yielding values of 55 and 77 pli (9.8 and 13.8 kg/cm) with complete failure occurring in the EPDM stock.

EXAMPLE 3

The procedure described in Example 1 was substantially repeated except: the EPDM was molded in 0.5 by 0.5 by 5 inch sections (1.27 × 1.27 × 12.7 cm), the metal was polished chrome-plated steel, degreased in tetrachloroethylene vapor and baked 4 minutes at 232°C.

T-peel measurements were corrected to 1-inch (2.54 cm) width by multiplications of observed values by two.

The samples, prepared as described above, were subjected to the environments described below.

TABLE I

| Test | T-Peel (kg/cm) | | Failure Mode |
|---|---|---|---|
| Control | 19.3, | 10.8 | EPDM stock tear |
| 14 days at 100% relative humidity, (38°C.) | 13.6, | 9.3 | EPDM stock tear |
| 14 days at 100% relative humidity, (38°C.) | 12.9, | 10.4 | EPDM stock tear |
| 14 days at 70°C. in an oven | 6.8, | * | EPDM stock tear |
| Ten cycles of: 4 hrs. at −29°C. 4 hrs. at 70°C. 16 hrs. in 100% relative humidity, 38°C. | 9.3, | 9.0 | EPDM stock tear |
| Ten cycles of: 4 hrs. at −29°C. 4 hrs. at 70°C. 16 hrs. in 100% relative humidity, 38°C. | 5.9, | 11.8 | EPDM stock tear |

* Sample broke in attempt to measure T-peel.

These tests show the resistance of the bond to prolonged exposure to heat and humidity.

EXAMPLE 4

The procedure described in Example 1 was repeated except the adhesive composition was prepared from 60 parts of the segmented copolyester, and 40 parts by weight of a low molecular weight thermoplastic terpene urethane resin. T-peel values obtained were 104 and 120 pli (18.6 and 21.9 kg/cm) with complete failure in the EPDM stock.

EXAMPLE 5

The procedure described in Example 1 was repeated except that exposure to ultraviolet light was replaced by placing the EPDM elastomer in an atmosphere of 250 ppm ozone for 10 minutes. T-peel values of 114 130 pli (20.4 and 23.3 kg/cm) were obtained with predominant failure in the EPDM plus a small amount of adhesive failure at one end.

EXAMPLE 6

The procedure described in Example 1 was repeated except that the exposure to ultraviolet light was replaced by passing the blue flame from a plumber's propane torch over the area for 1 minute, at a distance such that about one-third of the visible portion of the flame was deflected by the stock. This yielded T-peel values of 98 and 115 pli (17.5 and 20.6 kg/cm) with complete EPDM stock failure.

EXAMPLE 7

The procedure described in Example 1 was repeated except that the isocyanate was 10% 4,4',4''-triphenylmethane triisocyanate in dichloromethane solution. T-peel values of 62 and 84 pli (11.1 and 15.1 kg/cm) were obtained, with 100% failure in the EPDM stock.

EXAMPLE 8

The procedure described in Example 1 was repeated except that the adhesive composition contained only 50% by weight of the segmented copolyester, and 12.5% of a terpene thermoplastic phenolic-based resin having a ball and ring softening point of 115°C, and 37.5% of a low molecular weight polystyrene resin. The product gives T-peel values of 105 pli and 56–106 pli (19 kg/cm and 10-19 kg/cm). Failure was a combination of stock tear and failure at the adhesive-primer interface.

EXAMPLE 9

The procedure described in Example 1 was repeated except that the adhesive consisted of the segmented copolyester component alone, the blending with a low molecular weight polystyrene component being omitted. Because of the higher melting point of the unblended copolyester, it was pressed into a film at 204°C., rather than the 177°C. described in Example 1. The other steps of the bonding operation were similar to those described in Example 1 except that the hydraulic press was heated to 204°C., and pressure was applied for one minute.

The T-peel test was carried out as described in Example 1, yielding values of 81 and 82 pli (14.5 and 14.6 kg/cm) with complete failure occurring in the cured EPDM elastomer stock.

EXAMPLE 10

The procedure described in Example 1 was repeated except the size of EPDM was 0.5 × 0.5 inch, the primer employed was a chlorinated rubber-phenolic resin-based composition dispersed in a mixture of methyl isobutyl ketone and 2-ethoxyethanol (20% solids). The primer composition consisted of about 73% by weight of a mixture of chlorinated natural rubber and a heat curable phenolformaldehyde resol) about one part of rubber for each three parts of resol) and 27% by weight of a mixture of $SiO_2$, carbon black and a minor porportion of ZnO. The chlorine content of the solvent-free primer was 21.9 weight percent. This primer was applied to a steel coupon which was subsequently air dried.

T-peel values (corrected to 1 inch — 2.54 cm — width by multiplying the observed result by two) were 164 pli and 126 pli (29.3 and 22.5 kg/cm, respectively) with predominant failure in the EPDM stock.

The above procedure was repeated with a steel coupon, but the sample was submitted to 100% relative humidity at 37.8°C. (100°F.) for 14 days before T-peel testing. This yielded corrected T-peel values of 116 pli and 120 pli (20.8 and 21.5 kg/cm), respectively, with predominant failure in the EPDM stock as above.

I claim:

1. In a process for manufacturing a composite structure of a metal bonded to an elastomeric copolymer which comprises coating the oxidized surface of a cured elastomeric hydrocarbon copolymer made from ethylene and propylene with an organic polyisocyanate having at least two isocyanate groups per molecule, the improvement which comprises applying a chlorinated rubber/phenolic resin-based or an epoxy-based metal adhesive primer to the surface of the metal to be bonded, and interposing between the polyisocyanate coated elastomeric surface and the metal primed surface an adhesive composition, said adhesive composition comprising about 40–100 weight percent of a thermoplastic segmented copolyester having a melt index of less than 150 grams/10 minutes at 200°C. under a 2,160 gram load, and a melting point of at least about 125°C., said copolyester containing 15–75 weight percent short-chain ester units represented by the formula

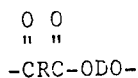

and 25–85 weight percent long-chain ester units represented by the formula

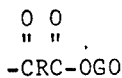

wherein R is a divalent aromatic radical having a molecular weight of about 76–220, D is a divalent organic radical having a molecular weight of about 28–195, and G is a divalent organic radical having a number-average molecular weight of about 566–3,966, and up to about 60 weight percent of a low molecular weight thermoplastic resin which forms compatible mixtures with the segmented copolyester, is thermally stable at 150°C., and has a melt viscosity of less than about 10,000 centipoises at 200°C., applying pressure to the metal and elastomer sufficient to bond them together thus forming said composite structure.

2. A process of claim 1 wherein the segmented copolyester adhesive contains 30 to 65 weight percent short-chain ester units and 30 to 75 weight percent long-chain ester units.

3. A process of claim 1 wherein the adhesive is a polyester made from a dicarboxylic acid having 8–16 carbon atoms, an aliphatic diol having 2–8 carbon atoms, and a poly(alkylene ether) glycol in which the alkylene group has 3–9 carbon atoms.

4. A process of claim 1 wherein the adhesive is a polyester made from the copolymerization of polytetramethylene ether glycol, 1,4-butanediol, and dimethyl terephthalate.

5. A process of claim 2 wherein the metal is steel.

6. A process of claim 1 wherein the adhesive contains 40–60 weight percent of the thermoplastic resin.

7. A process of claim 2 wherein the elastomeric copolymer is made from ethylene, propylene and a nonconjugated diene.

8. A process of claim 7 wherein the nonconjugated diene is 1,4-hexadiene.

9. A process of claim 7 wherein the metal is chrome-plated steel.

10. A process of claim 7 wherein the epoxy-based primer is a linear copolymer of epichlorohydrin and 4,4'-propylidenebisphenol.

11. A process of claim 7 wherein the primer is a chlorinated rubber/phenol-formaldehyde resin.

12. A process of claim 7 wherein the thermoplastic resin is low molecular weight polystyrene.

13. A process of claim 7 wherein the low molecular weight resin is a polyindene.

14. A bonded composite structure consisting essentially of a cured elastomeric copolymer made from at least ethylene and propylene adhered to a metal substrate by a layer of adhesive, said elastomeric copolymer being oxidized and coated with an organic polyisocyanate, said metal coated with a chlorinated rubber/phenolic-based or an epoxy-based adhesive primer, said adhesive comprising about 40–100 weight percent of a thermoplastic segmented copolyester having a melt index of less than 150 grams/10 minutes at 200°C. under a 2,160 gram load, a melting point of at least about 125°C., said copolyester containing 15–75 weight percent short-chain ester units represented by the structure

and 25–85 weight percent long-chain ester units represented by the structure

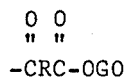

where R is a divalent aromatic radical having a molecular weight of about 76–220, D is a divalent organic radical having a molecular weight of about 28–195, and G is a divalent organic radical having a number-average molecular weight of about 566 to 3,966 and up to about 60 weight percent of a low molecular weight thermoplastic resin which forms compatible mixtures with the segmented copolyester, is thermally stable at 150°C., and has a melt viscosity of less than about 10,000 centipoises at 200°C.

15. A composite structure of claim 14 wherein the copolymer contains units of ethylene, propylene and nonconjugated diene.

16. A composite structure of claim 15 wherein the metal is steel.

17. A composite structure of claim 15 wherein the polyester adhesive contains units of a dicarboxylic acid having 8–16 carbon atoms, units of an aliphatic diol having 2–8 carbon atoms and units of a poly(alkylene ether) glycol in which the alkylene group has 3–9 carbon atoms.

18. A composite structure of claim 15 wherein the polyester adhesive contains units of polytetramethylene ether glycol, 1,4-butanediol and dimethyl terephthalate.

19. A composite structure of claim 15 wherein the copolymer contains by weight about 25–35 percent propylene monomer units, about 1–8 percent monomer units of a nonconjugated diolefin containing only one polymerizable double bond selected from (1) an aliphatic diolefin and (2) a cycloaliphatic compound having a one- or two-carbon bridged ring structure, and about 0.1–0.4 percent 2,5-norbornadiene monomer units.

20. A composite structure of claim 19 wherein the nonconjugated diolefin is 1,4-hexadiene, 5-ethylidene-2-norbornene, dicyclopentadiene, or 5-(2'-propenyl)-2-norbornene.

* * * * *